(12) United States Patent
Cecchin et al.

(10) Patent No.: US 7,332,556 B2
(45) Date of Patent: Feb. 19, 2008

(54) CRYSTALLINE POLYMERS OF PROPYLENE HAVING IMPROVED PROCESSABILITY IN THE MOLTEN STATE AND PROCESS FOR THEIR PREPARATION

(75) Inventors: Giuliano Cecchin, Ferrara (IT); Anteo Pelliconi, Ferrara (IT); Antonio Ciarrocchi, Ferrara (IT); Paolo Ferrari, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 128 days.

(21) Appl. No.: 11/385,711

(22) Filed: Mar. 22, 2006

(65) Prior Publication Data

US 2006/0160963 A1    Jul. 20, 2006

Related U.S. Application Data

(60) Division of application No. 10/361,569, filed on Feb. 11, 2003, now Pat. No. 7,074,871, which is a continuation of application No. 08/338,284, filed on Nov. 10, 1994, now abandoned, which is a continuation of application No. 07/997,378, filed on Dec. 28, 1992, now abandoned.

(30) Foreign Application Priority Data

May 29, 1992 (IT) ............................. MI92A1337

(51) Int. Cl.
C08F 110/06 (2006.01)

(52) U.S. Cl. .................. 526/351; 526/65; 526/124.1; 526/124.2; 526/124.3

(58) Field of Classification Search ............... 526/351, 526/65, 124.1, 124.2, 124.3
See application file for complete search history.

(56) References Cited

U.S. PATENT DOCUMENTS

| | | | |
|---|---|---|---|
| 3,857,795 A | 12/1974 | Van Der Bend et al. ... | 252/429 |
| 4,547,552 A | 10/1985 | Toyota et al. ............... | 525/247 |
| 4,576,994 A | 3/1986 | Dorrer et al. ............... | 525/247 |
| 4,771,103 A | 9/1988 | Chiba et al. .................. | 525/53 |
| 4,970,280 A | 11/1990 | Chiba et al. .................. | 526/65 |
| 5,116,896 A | 5/1992 | Hirose et al. ............... | 525/190 |
| 5,147,936 A | 9/1992 | Peszkin et al. ............. | 525/240 |
| 5,218,052 A * | 6/1993 | Cohen et al. ............... | 525/240 |

FOREIGN PATENT DOCUMENTS

| | | |
|---|---|---|
| EP | 0 098 077 | 1/1984 |
| EP | 0 350 170 | 1/1990 |
| EP | 0 350 170 A2 * | 1/1990 |
| EP | 0 385 765 | 9/1990 |
| JP | 59-172507 | 9/1984 |

OTHER PUBLICATIONS

Turner, "Metallocene-Based Single-Site Catalysis for Olefin Polymerization," Exxon (1993).
ASTMD 1238-90b, "Standard Test for Flow Rates of Thermoplastics by Extrusion Plastometer," pp. 393-401, no date.
Ser and der Ven, "Polypropylene and Other Polyolefines," p. 78 (1990).

* cited by examiner

*Primary Examiner*—Ling-Sui Choi
(74) *Attorney, Agent, or Firm*—William R Reid

(57) ABSTRACT

Crystalline polymers and copolymers of propylene having total MIL values>2 g/10 minutes, total [$\eta$] values in tetrahydronaphthalene at 135° C.$\leq$2.8 dl/g, mW/MN values>20, a fraction insoluble in xylene at 25° C.$\geq$94, and including from 10 to 60% by weight of a fraction (A) having [$\eta$]$\geq$2.6, are prepared by way of sequential polymerization in at least two stages, in the presence of a particular Ziegler-Natta catalysts supported on magnesium halides. These polymers have high melt strength, high mechanical properties, and are particularly adequate for the manufacture of articles by using various conversion technologies, such as for example extrusion in thin sheets to be subjected to thermoforming, as well as for injection molding, and blow molding.

4 Claims, No Drawings

CRYSTALLINE POLYMERS OF PROPYLENE HAVING IMPROVED PROCESSABILITY IN THE MOLTEN STATE AND PROCESS FOR THEIR PREPARATION

This application is a division of U.S. application Ser. No. 10/361,569, filed Feb. 11, 2003, now U.S. Pat. No. 7,074,871, which is a continuation of U.S. application Ser. No. 08/338,284, filed Nov. 10, 1994 and now abandoned, which is a continuation of U.S. application Ser. No. 07/997,378, filed Dec. 28, 1992 and now abandoned.

The present invention concerns crystalline polymers and copolymers of propylene having improved processability in the molten state, and the process for their preparation.

By virtue of the high melt index values (MIL), high melt strength, and their valued mechanical properties, the polymers of the present invention are particularly adequate for the extrusion of thin sheets to be subjected to thermoforming, as well as for injection molding and blow molding processes.

It is known that, thanks to the high stereospecificity levels reached by the Ziegler-Natta catalysts, today one can prepare crystalline polymers and copolymers of propylene having high mechanical properties, and, therefore, adequate for the manufacture of articles with good rigidity and mechanical resistance, even if they are small and thin. However the commonly used propylene polymers show low levels of melt strength, i.e., viscoelasticity in the molten state, which cause an irregular deformation of the melted mass during the conversion processes with the subsequent problems related to workability. In the case of blow molding the low melt strength can cause, for example, a collapse of the preform and thickness irregularities. It is known that the melt strength of propylene polymers can be significantly improved by widening the molecular weight distribution (MWD) of said polymers.

For example, according to published European patent n. 98077, one can obtain propylene polymers having high rigidity and viscoelasticity in the molten state by way of a sequential polymerization process in the presence of particular catalysts based on $TiCl_3$. According to said process, one produces from 35 to 65% by weight of a fraction having a relatively high intrinsic viscosity, and from 65 to 35% by weight of a fraction having a lower intrinsic viscosity value, by operating in separate and subsequent stages. The viscosities in the single stages are regulated by the opportune dosing of the molecular weight regulating agent (hydrogen). The difference between the two intrinsic viscosities ranges from 3 to 6.5. Even if the MWD values for the polymers thus obtained are not reported, it is reasonable to assume that the MWD is wider with respect to the one that can be obtained from a polymerization carried out at constant concentration of the molecular weight regulating agent, since the two fractions must have molecular weights shifted towards different values.

However, as clearly indicated in the description of the above mentioned European application, the Melt Index of the polymers thus obtained cannot exceed 2 if one wants to avoid sagging phenomena during the thermoforming of the sheets obtained from said polymers.

Obviously, this limitation presents a great disadvantage, because Melt Index values that low restrict the application to a limited number of technologies, by slowing down and making more difficult the process.

U.S. Pat. No. 4,970,280, describes a process for the production of propylene polymers having high viscoelasticity in the molten state, which process also comprises multiple stages where, by proper regulation of the molecular weight regulator (hydrogen), one can produce polymer fractions having different Melt Index values.

The catalyst used in the examples is based on supported $TiCl_3$, and the improved processability is attributed to a wider MWD. The description mentions that the Melt Index of the polymers obtained in this manner can vary from 0.01 to 100, but it is specified that the polymers to be used for the thermoforming of sheets must have a Melt Index value ranging from 0.05 to 10, preferably from 0.1 to 5. In the examples, the melt index values are not higher than 0.67 for the propylene homopolymers, and 1.5 for the copolymers containing ethylene.

For the purpose of verification, the Applicant has prepared polymers with a wide MWD using catalysts based on supported $TiCl_3$ (operating with two polymerization stages), and found that at relatively low Melt Index values, said polymers are very brittle.

Therefore, it is obvious that by using catalysts based on supported $TiCl_3$ one does not obtain good results at high Melt Index and wide MWD values.

The objective of the present invention, therefore, cannot be reached.

It is also known, from Japanese Kokai patent application n. 59-172,507, that crystalline polymers of propylene with wide MWD, having good processability, and excellent mechanical characteristics, can be obtained by way of sequential polymerization in the presence of high-yield Ziegler-Natta catalysts supported on magnesium halides. According to the process described in the above patent application, by operating in separate and consecutive stages, from 35 to 65% by weight of a fraction having an intrinsic viscosity from 1.8 to 10 dl/g, and from 35 to 65% by weight of a fraction having an intrinsic viscosity from 0.6 to 1.2 dl/g are produced. According to the description, the polymer thus obtained can have a MWD, in terms of mW/MN, ranging from 6 to 20; in the examples, the maximum mW/MN value is 11.2.

In the above patent application no Melt Index values are given; however, one can deduce from the low spiral flow values, that the processability of the polymers is not particularly good.

The Applicant has now found that by using particular Ziegler-Natta high yield catalysts supported on magnesium halides one can prepare, by way of sequential polymerization in two or more stages, crystalline polymers and copolymers of propylene having mW/MN values, measured by way of gel permeation chromatography (G.P.C.), higher than 20, elevated Melt Index values (MIL according to ASTM D 1238), and excellent mechanical properties. Thanks to the above high mW/MN and MIL values, the polymers of the present invention, as previously stated, have better processability in the molten state. Therefore, object of the present invention are crystalline polymers and copolymers of propylene having total MIL values>2 g/10 minutes, preferably from 3 to 50, more preferably from 3 to 30, values of total $[\eta]$ in tetrahydronaphthalene at 135° C. $\leq 2.8$ dl/g, preferably from 2.1 to 1.10, more preferably from 2.1 to 1.26, mW/MN values>20, or even greater than 30, generally from 21 to 50, preferably not over 40, a fraction insoluble in xylene at 25° C.$\geq 94$, preferably $\geq 96$, and comprising from 10 to 60%, preferably from 25 to 60%, more preferably from 30 to 50% by weight, of a fraction (A) having $[\eta] \geq 2.6$, preferably a 4.0, particularly from 4 to 9; said polymers and copolymers having flexural modulus values from 1600 to 2700 MPa, Izod at 23° C. from 15 to 100, preferably from 20 to 100 J/m, yield stress from 35 to 45 MPa (details on the methods used will be given in the examples).

The remaining fraction of the polymers and copolymers of the present invention is selected in such a way as to have the values of total MIL, total [η], and fraction insoluble in xylene at 25° C. set forth above.

Within the definition of the present invention are, in particular, crystalline polymers and copolymers of propylene comprising the above fraction (A), and from 40 to 90% by weight, preferably from 40 to 75%, more preferably from 50 to 70%, of a fraction (B) having MIL≧50, preferably≧100, in particular from 100 to 1000, and [η]≦1.2, preferably≦0.90, particularly from 0.90 to 0.4.

The above fraction (A) generally has MIL values lower than 0.5, preferably lower than 0.1, but since such low MIL values are difficult to measure exactly, it is preferable, for said fraction (A), to refer to the intrinsic viscosity [η] in tetrahydronaphthalene at 135°.

Besides comprising the homopolymers of propylene, in particular the isotactic or mainly isotactic homopolymers, the definition of the present invention also refers to the copolymers of propylene with ethylene and/or superior α-olefins, preferably $C_4$-$C_8$, in quantities preferably ranging from 0.5 to 6% by weight, more preferably from 2 to 6% by weight with respect to the total copolymer.

Examples of $C_4$-$C_8$ α-olefins are 1-butene; 1-pentene; 1-hexene; 4-methyl-1-pentene; 1-octene. The above copolymers have more clarity and a lower melt point than the homopolymers.

It is also possible to add various types of additives to the polymers of the present invention, such as, for example, stabilizers, nucleating agents, pigments, and fillers commonly used for polymers of olefins.

In particular, the addition of nucleating agents brings about a considerable improvement in important physical-mechanical properties, such as flexural modulus, heat distortion temperature (HDT), yield stress, and clarity. Typically, the HDT values of the polymers of the present invention are higher than 110° C. at 455 KPa in the absence of additives (in the best cases they are higher than 120° C.), and can even exceed 130° C. in the presence of nucleating agents. Typical examples of nucleating agents are the p-tert.-butyl benzoate, and the 1,3 and 2,4 dibenzylidenesorbitol. Generally speaking, it is better if the nucleating agents are added to the polymers of the present invention in quantities ranging from 0.05 to 2% by weight, and preferably from 0.1 to 1% by weight with respect to the polymers.

The addition of inorganic fillers, such as talc, calcium carbonate, and mineral fibers, also brings about an improvement to some mechanical properties, such as flexural modulus and HDT. The talc can also have a nucleating effect. In order to improve the balance of different mechanical properties (for example the balance between flexural modulus and impact resistance), the polymers of the present invention can also comprise opportune amounts of olefinic elastomers. Said elastomers can be prepared separately and added to the crystalline polymers or copolymers defined above by way of blending in the molten state, or may be prepared directly in synthesis using an additional polymerization stage. In general, olefinic elastomers are the ones commonly used to confer better impact resistance to polyolefins; however, in the case of the polymers of the present invention, the result is a particularly good balance between rigidity (flexural modulus) and impact resistance (Izod).

Examples of the above olefinic elastomers are ethylene-propylene copolymers containing from 30 to 85% in moles of ethylene (EPR rubbers), where optionally a portion from 5 to 15% in moles of the propylene is substituted by $C_4$-$C_8$ superior α-olefins (specific examples are 1-butene, 1-pentene, 1-hexene, 4-methyl-1-pentene). Other examples of elastomers are ethylene-propylene-diene terpolymers (EPDM rubbers) containing from 30 to 85% in moles of ethylene, and from 0.5 to 10% in moles of diene, and whereas for the above mentioned EPR, a portion ranging from 5 to 15% in moles of the propylene can be substituted by $C_4$-$C_8$ superior α-olefins. Preferred examples of dienes for the EPDM rubbers are: 1,4-hexadiene; dicyclopentadiene; 2-ethylidene-5-norbornene. Generally speaking, olefinic elastomers can be present in the polymers and copolymers of the present invention in quantities ranging from 2 to 50% by weight with respect to the weight of said polymers and copolymers, preferably from 5 to 20%, more preferably from 5 to 15%.

As previously stated, the crystalline polymers and copolymers of the present invention can be prepared by way of polymerization processes based on the use of particular Ziegler-Natta catalysts.

Said catalysts contain, as essential element, a solid catalyst component (a) comprising a titanium compound having at least one titanium-halogen bond, and an electron-donor compound, both supported on a magnesium halide in active form, and are characterized by the fact that they are capable of producing propylene polymers with a content of fraction insoluble in xylene at 25° C. higher than or equal to 94% by weight, preferably higher than or equal to 96%. Moreover, said catalysts must have a sensitivity to molecular weight regulators (particularly hydrogen), high enough to produce polypropylene in a MIL range comprised between values lower than or equal to 0.5 (i.e., in terms of [η] values higher than or equal to 2.6), and higher than or equal to 50 g/10 min., preferably higher than or equal to 100, particularly from 100 to 1000 g/10 min. The catalysts used in the process of the present invention, therefore, are obtained by contacting:

(a) the above mentioned solid catalyst component;
(b) an Al-alkyl compound;
(c) an external electron-donor compound.

Solid catalyst components (a) having the above mentioned characteristics are well known in patent literature.

Particularly suited are the solid catalyst components used in the catalysts described in U.S. Pat. No. 4,339,054, and European patent n. 45.977. Other examples are set forth in U.S. Pat. No. 4,472,524.

In general, the solid catalyst components used in said catalysts comprise, as electron-donor compounds, compounds selected from the ethers, ketones, lactones, compounds containing N, P, and/or S atoms, and esters of mono- and dicarboxylic acids.

Particularly suited are the esters of phthalic acid, such as diisobutyl, dioctyl and diphenyl phthalate, and benzylbutyl phthalate; the esters of malonic acid such as diisobutyl and diethyl malonate; the alkyl and aryl pivalates, the alkyl, cycloalkyl and aryl maleates, alkyl and aryl carbonates such as diisobutyl carbonate, ethyl phenyl carbonate, and diphenyl carbonate; the esters of succinic acid such as mono and diethyl succinate.

The preparation of the above mentioned catalyst components is carried out according to various methods.

For example, the magnesium halide (anhydrous, i.e., containing less than 1% of water), the titanium compound, and the electron-donor compound can be milled under conditions where the magnesium halide is activated; the milled product is then treated one or more times with an excess of $TiCl_4$ at temperatures from 80 to 135° C., after which it is washed repeatedly with a hydrocarbon (hexane, for example) until all the chlorine ions have disappeared.

According to another method, the anhydrous magnesium halide is preactivated according to known methods, and then caused to react with an excess of TiCl$_4$ containing the electron-donor compound in solution. Here again the operation takes place at temperatures ranging from 80° C. and 135° C. Optionally, the treatment with TiCl$_4$ is repeated, and the solid washed with hexane, or another hydrocarbon solvent, in order to eliminate all traces of nonreacted TiCl$_4$.

According to another method, a MgCl$_2$.nROH adduct (in particular under the form of spheroidal particles), where n is generally comprised from 1 and 3, and ROH is ethanol, butanol, or isobutanol, is caused to react with an excess of TiCl$_4$ containing the electron-donor compound in solution. The temperature generally ranges from 80° C. to 120° C. The solid is then isolated and caused to react once more with the TiCl$_4$, after which it is separated and washed with a hydrocarbon until all chlorine ions have disappeared.

According to another method, magnesium alcoholates and chloroalcoholates (particularly the chloroalcoholates prepared according to the method described in U.S. Pat. No. 4,220,554) are caused to react with an excess of TiCl$_4$ containing the electron-donor compound in solution, operating under the reaction conditions already described.

In the solid catalyst component (a), the titanium compound expressed as Ti is generally present in a percentage ranging from 0.5 to 10% by weight; The quantity of electron-donor compound which remains fixed on the solid component (internal donor), generally ranges from 5 to 20% in moles with respect to the magnesium dihalide.

The titanium compounds which can be used for the preparation of the solid catalyst component (a) are the halides and the halogen alcoholates. Titanium tetrachloride is the preferred compound.

Satisfactory results can be obtained also with titanium trihalides, particularly TiCl3HR, TiCl$_3$ ARA or with haloalcoholates such as TiCl$_3$OR where R is a phenyl radical.

The reactions indicated above bring to the formation of magnesium halide in active form. Besides these reactions, other reactions are known in the literature which cause the formation of activated magnesium halide starting from magnesium compounds different from the halides, such as carboxylates of magnesium, for example.

The active form of the magnesium halides in the catalyst components (a) can be recognized by the fact that in the X-ray spectrum of the catalyst component the maximum intensity reflection, which appears in the spectrum of the nonactivated magnesium chloride (having a surface area smaller than 3 m$^2$/g), is no longer present, but in its place there is a halo with the maximum intensity shifted with respect to the position of the maximum intensity reflection of the nonactivated magnesium dihalide, or by the fact that the maximum intensity reflection shows a half peak breadth at least 30% greater than the one of the maximum intensity reflection which appears in the nonactivated Mg chloride spectrum.

The most active forms are those where the halo appears in the X-ray spectrum of the component.

Among the magnesium halides, the chloride is the preferred compound. In the case of the most active forms of magnesium chloride, the X-ray spectrum of the catalyst component shows a halo instead of the reflection which in the spectrum of the nonactivated chloride appears at a distance of 2.56 Å.

The Al-alkyl compounds (b) used as co-catalysts comprise the Al-trialkyls, such as Al-triethyl, Al-triisobutyl, Al-tri-n-butyl, and linear or cyclic Al-alkyl compounds containing two or more Al atoms bonded by way of O or N atoms, or SO$_4$ and SO$_3$ groups.

Examples of these compounds are:

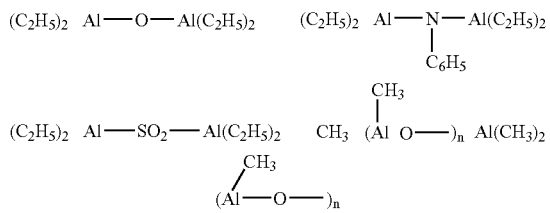

where n is a number from 1 to 20.

The Al-alkyl compound is generally used in such quantities that the Al/Ti ratio ranges from 1 to 1000. In addition to the solid catalyst component (a) and the Al-alkyl compound (b), the catalysts used in the process of the present invention comprise an external electron-donor compound (c) (i.e., an electron-donor added to the Al-alkyl compound). Said external electron-donor compound is selected from silanes capable of conferring to the catalyst the above mentioned levels of stereospecificity (determined by the high content of fraction insoluble in xylene at 25° C.) and sensitivity to the molecular weight regulator.

Suitable for this purpose are the silanes containing at least one cyclopentyl group bonded to the silicon, and one or more —OR groups also bonded to the silicon atom, where R is a C$_1$-C$_{18}$ alkyl, C$_3$-C$_{18}$ cycloalkyl, C$_6$-C$_{18}$ aryl, or C$_7$-C$_{18}$ aralkyl radical. Preferably R is methyl or ethyl. Particularly suited is the dicyclopentyldimethoxysilane (DCPMS). The above mentioned external donors are generally used in quantities ranging from 0.001 to 15 moles, preferably from 1 to 10 moles with respect to the moles of Al-alkyl compound (b). Therefore, another object of the present invention is a process for the preparation of the crystalline polymers and copolymers of propylene described above, comprising the polymerization of monomers in the presence of the above catalysts, wherein the polymerization occurs in at least two stages, preparing fractions (A) and (B) in separate and consecutive stages, and operating in each stage in the presence of the polymer and the catalyst coming from the preceding stage.

The polymerization process can be carried out in batch or in continuous, according to known techniques, operating in liquid phase in the presence or not of an inert diluent, or in gas phase, or liquid-gas phase.

It is preferable to operate in gas phase.

Reaction times and temperatures are not critical; however, the temperature preferably ranges from 20° C. to 100° C.

As previously stated the regulation of the molecular weight is done by using known regulators, particularly hydrogen.

By properly dosing the concentration of the molecular weight regulator in the various stages, one obtains the [η] and MIL values previously described for (A) and (B).

Preferably, one prepares first fraction (A) and then fraction (B). Each of the two fractions can be prepared in multiple polymerization stages.

The catalysts can be precontacted with small quantities of olefins (prepolymerization). Prepolymerization improves both catalyst activity and morphology of polymers.

The prepolymerization is carried out maintaining the catalyst in suspension in a hydrocarbon solvent (hexane or heptane, for example), and it is polymerized between room temperature and 60° C. for a period of time which is sufficient to produce a quantity of polymer ranging from 0.5 to 3 times the weight of the solid component. It can also be carried out in liquid propylene under the above indicated temperature conditions, and producing quantities of polymer that can reach 1000 g per g of catalyst component.

The following examples are given in order to illustrate and not limit the present invention.

General Process for the Preparation of the Catalyst

The solid catalyst component (a) used in the examples is prepared as follows.

In inert atmosphere one introduces in a reactor equipped with agitator 28.4 g of $MgCl_2$, 49.5 g of anhydrous ethanol, 100 ml of ROL OB/30 vaseline oil, 100 ml of silicon oil having a viscosity of 350 cs, and the content is heated to 120° C. until the $MgCl_2$ is dissolved. The hot reaction mix is then transferred to a 1500 ml vessel containing 150 ml of vaseline oil and 150 ml of silicon oil, and equipped with an Ultra Turrax T-45 agitator. The temperature is maintained at 120° C. while the content is stirred for 3 minutes at 3000 rpm. The mixture is then discharged into a 2 liter vessel equipped with agitator and containing 1000 ml of anhydrous n-heptane cooled to 0° C. The particles obtained are recovered by filtration, washed with 500 ml aliquots of n-hexane, and gradually heated by bringing the temperature to 180° C. in nitrogen flow, thus obtaining a decrease in alcohol content from 3 moles to 2.1 moles per mole of $MgCl_2$. 25 g of the adduct thus obtained are transferred in a reactor equipped with agitator and containing 625 ml of $TiCl_4$, at 0° C., under agitation, heating it to 100° C. in the space of one hour. When the temperature reaches 40° C. one adds enough diisobutyl phthalate to bring the magnesium/phthalate molar ratio to 8.

The content of the reactor is heated to 100° C. for two hours while stirring, and then the solid is allowed to settle. The hot liquid is syphoned out. One adds 550 ml of $TiCl_4$ and the mixture is heated to 120° C. for one hour while stirring. Said stirring is interrupted, and the solid allowed to settle. The liquid is syphoned hot, then the solid is washed 6 times with 200 ml of n-hexane at 60° C. each time, and then three times at ambient temperature.

EXAMPLES 1 AND 2

The polymerization is carried out in continuous in a series of reactors equipped with devices for the transfer of the product coming from the reactor immediately preceding to the one immediately following.

In gas phase the hydrogen and the monomer are analyzed in continuous and fed in such a manner that the desired concentrations will be maintained constant.

In the following polymerization runs, a mixture of triethylaluminum (TEAL) activator and dicyclopentyldimethoxisilane electron-donor (the TEAL/silane weight ratio is shown in table 1) is contacted with the solid catalyst component in a container at 40° C. for 13 minutes, in such a way that the TEAL/Ti molar ratio is 80.

The catalyst is then transferred to a reactor containing an excess of liquid propylene, and prepolymerized at 20° C. for a period ranging from 1.5 to 2 minutes ca.

The prepolymer is then transferred in another reactor where the polymerization occurs in gas phase to form fraction (A).

The product of the above reactor is fed to the second reactor in gas phase and eventually the product of the second reactor is fed into a third reactor in gas phase to form fraction (B).

The starting products and relative operating conditions are shown in Table 1A; the results of the polymerization tests are shown in Table 1B.

The following analytic methods were used for the analyses reported in Table 1B.

| Property | Method |
|---|---|
| MIL | ASTM D 1238 |
| [η] intrinsic viscosity | Determined in tetrahydronaphthalene at 135° C. |
| Insoluble in xylene | (see note that follows) |
| Flexural modulus at 23° C. | ASTM D 790 |
| Stress at yield and break | ASTM D 638, test velocity 50 mm/min. |
| Notched Izod impact test | ASTM D 256/A |
| HDT at 455 Kpa | ASTM D 648 |
| Mw/Mn | Measured by way of Gel Permeation Chromatography |
| Melt Tension Test (MTT), g | (see note that follows). |

The samples to be subjected to the various physical-mechanical determinations have been molded from material which was stabilized with IRGANOX 1010 (0.1% by weight) and BHT (2,6-di-tert-butyl-p-cresol) (0.1% by weight), and then pelletized with a single-screw Bandera extruder (diameter of the cylinder 30 mm), at 210° C. using a Negri & Bossi 90 injection press.

Note

Determination of the Percentage of Insoluble in Xylene 2.5 g of polymer are dissolved in 250 ml of xylene at 135° C. under agitation. After 20 minutes the solution is allowed to cool to 25° C., still under agitation, and then allowed to settle for 30 minutes.

The precipitate is filtered with filter paper, the solution evaporated in nitrogen flow, and the residue dried under vacuum at 80° C. until constant weight is reached. Thus one calculates the percent by weight of polymer insoluble in xylene at ambient temperature (25° C.). The percentage by weight of polymer insoluble in xylene at ambient temperature is considered the isotactic index of the polymer. The value thus obtained corresponds basically to the isotactic index determined by way of extraction in boiling n-heptane, which by definition constitutes the isotactic index of polypropylene.

Melt Tension Test

The apparatus used is the Melt Tension Tester produced by Toyo-Seiki Seisakusho Ltd., equipped with Personal Computer for data acquisition and processing; the method consists of measuring in grams the tension offered by a strand of molten polymer stretched at a specific pre-set stretch ratio.

In particular, by operating with the above mentioned apparatus, the polymer to be examined is extruded at 200° C. through a capillary 8 mm long and 1 mm in diameter; the strand is then subjected to stretching, at pre-set stretch ratios (100 or 200) using a drawing system with a constant acceleration of 0.2 $cm/sec^2$. The tension resulting from the above drawing is measured (in g). The higher the tension, the higher the melt strength.

TABLE 1A

| | EXAMPLE | |
|---|---|---|
| | 1 | 2 |
| TEAL/Silane (weight) | 2.6 | 2.8 |
| FIRST REACTOR IN GAS PHASE | | |
| Temperature, ° C. | 80 | 80 |
| Pressure, atm | 24 | 24 |
| Residence time, min | 53.6 | 30 |
| $H_2/C_3$ (mol) | 0.000 | 0.000 |
| SECOND REACTOR IN GAS PHASE | | |
| Temperature, ° C. | 80 | 80 |
| Pressure, atm | 24 | 24 |
| Residence time, min | 65.5 | 100 |
| $H_2/C_3$ (mol) | 0.299 | 0.500 |
| THIRD REACTOR IN GAS PHASE | | |
| Temperature, ° C. | 80 | — |
| Pressure, atm | 23 | — |
| Residence time, min | 51.3 | — |
| $H_2/C_3$ (mol) | 0.491 | — |

TABLE 1B

| | EXAMPLE | |
|---|---|---|
| | 1 | 2 |
| FIRST REACTOR IN GAS PHASE | | |
| MIL, g/10 min. | — | — |
| [η], dl/g | 4.87 | 4.26 |
| Polymer produced, % by weight | 43.3 | 33.7 |
| SECOND REACTOR IN GAS PHASE | | |
| MIL, g/10 min. | 190 | 500 |
| [η], dl/g | 0.736 | 0.54 |
| Polymer produced, % by weight | 33.2 | 66.3 |
| THIRD REACTOR IN GAS PHASE | | |
| MIL, g/10 min. | 480 | — |
| [η], dl/g | 0.514 | — |
| Polymer produced, % by weight | 23.5 | — |
| CHARACTERIZATION OF THE TOTAL POLYMER | | |
| Insoluble in xylene, % by weight | 97.3 | 98 |
| MIL, g/10 min. | 3.3 | 15 |
| [η], dl/g | 1.98 | 1.6 |
| Flexural modulus, MPa | 2330 | 2500 |
| Stress at yield, MPa | 38.3 | 39 |
| Stress at break, MPa | 24.5 | 37 |
| Izod, J/m | 40 | 20 |
| HDT, ° C. | 117.5 | 118 |
| Mw/Mn | 21.8 | 26 |
| MTT*, g | 2.98 | 1.17 |

*Stretch ratio = 100

In example 1 the fraction (B) is produced in the second and third reactors in gas phase.

In fact, the [η] and MIL values calculated considering the sum of the polymers prepared in the second and third reactors in gas phase, are respectively 0.64 and 321.

In Example 2 the fraction (B) is produced in the second reactor in gas phase.

EXAMPLES 3 AND 4

In a 22 liter autoclave equipped with helicoidal agitator and a water/steam operated temperature regulating jacket, are fed 7 kg of propylene at ambient temperature. Then one introduces 0.1915 g (Example 3) and 0.2438 g (Example 4) of a catalyst component prepared as described above, together with 6.52 g of triethyl aluminum, and 39 g of dicyclopentyl dimethoxysilane, precontacted with the catalyst component for 10 minutes at room temperature in 50 ml of hexane. The autoclave is brought to polymerization temperature in about 7-8 minutes, and the polymerization continues for the time necessary to produce the desired quantity of fraction (A) (first stage of polymerization).

Once the first stage is completed, the hydrogen is introduced in the proper quantity, and the polymerization continues for the time necessary to produce the desired quantity of fraction (B) (second stage of polymerization). The composition of the gas phase at the top of the autoclave is determined by gas chromatography.

The polymerization conditions are set forth in Table 2A, while the results of the polymerization tests are shown in Table 2B.

The molar percentages of hydrogen reported in Table 2A relate to the gas phase at the top of the autoclave; the results in Table 2B were obtained with the same methods used for the products of Examples 1 and 2, the difference being that the MTT test was carried out at a stretch ratio of 200.

Note

For the preceding Examples 1-4, the MIL and [η] values for fraction (B) have been calculated by using the following relations:

$$\log \text{MIL } (A+B) = \phi_A \log \text{MIL } (A) + \phi_B \log \text{MIL } (B)$$

$$[\eta] (A+B) = \phi_A [\eta]_{(A)} + \phi_B [\eta](B)$$

where

MIL (A) = MIL of fraction (A)

MIL (B) = MIL of fraction (B)

MIL (A+B) = MIL of the sum of fractions (A) and (B).

The same goes for [η]

$$\varnothing A = \frac{\text{weight of fraction } (A)}{\text{weight of the sum of fractions } (A) \text{ and } (B)}$$

$$\varnothing B = \frac{\text{weight of fraction } (B)}{\text{weight of the sum of fractions}(A) \text{ and } (B)}$$

TABLE 2A

| | EXAMPLE | |
|---|---|---|
| | 3 | 4 |
| FIRST POLYMERIZATION STAGE | | |
| Temperature, ° C. | 70 | 70 |
| Pressure, atm | 30 | 29.5 |
| Time, min. | 30 | 60 |
| $H_2$, % in moles | 0 | 0 |
| SECOND POLYMERIZATION STAGE | | |
| Temperature, ° C. | 63 | 63 |
| Pressure, atm | 35.7 | 35.8 |
| Time, min. | 150 | 70 |
| $H_2$, % in moles | 18.1 | 18.1 |

TABLE 2B

|  | EXAMPLE | |
| --- | --- | --- |
|  | 3 | 4 |
| FIRST POLYMERIZATION STAGE | | |
| MIL, g/10 min. | — | — |
| [η], dl/g | 7.97 | 7.93 |
| Polymer produced, % by weight | 12.7 | 28.6 |
| SECOND POLYMERIZATION STAGE | | |
| MIL, g/10 min. | 281 | 236 |
| [η], dl/g | 0.67 | 0.71 |
| Polymer produced, % by weight | 87.3 | 71.4 |
| CHARACTERIZATION OF THE TOTAL POLYMER | | |
| Insoluble in xylene, % by weight | 97.9 | 97.2 |
| MIL, g/10 min. | 33.8 | 3.2 |
| [η], dl/g | 1.6 | 2.78 |
| Flexural modulus, MPa | 2580 | 2350 |
| Stress at yield, MPa | 41.4 | 39 |
| Stress at break, MPa | 40.3 | 33.3 |
| Izod, J/m | 16.3 | 16 |
| HDT, ° C. | 134 | 120 |
| Mw/Mn | 22.4 | 21.9 |
| MTT, g | 1.39 | 3.18 |

The following examples were conducted in order to verify the properties of the polymers with a wide MWD and high MIL that can be obtained with catalysts based unsupported $TiCl_3$.

Comparative Examples 1 and 2

Preparation of the Catalyst Component

In a 500 ml flask equipped with mechanical agitator, cooling device, drip funnel, and feed valve for the nitrogen, are introduced in order 100 ml of n-heptane and 25.5 ml of $TiCl_4$. The temperature of the solution is brought to 10° C. by way of a water and ice bath, and then 117 ml of an $Al_2Et_3Cl_3$ solution at 30.5% by weight is introduced dropwise in 60 minutes, always at 10° C. and under moderate agitation. It is allowed to agitate at 10° C. for 3 hours and 30 minutes, then the reaction mass is brought to 80° C. for 1 hour. The solid thus formed is allowed to settle, the diluent is eliminated by way of filtration, and the precipitate is washed five times with 125 ml of n-heptane each time. Afterwards, one introduces into the flask, in order and at room temperature, 125 ml of n-heptane, 8 ml of $TiCl_4$ and 30 g of n-butyl ether. The content is brought to 90° C. for two hours under moderate agitation; the solvent is eliminated by way of filtration, and the precipitate is washed 5 times with 125 ml of n-heptane each time. The solid is then dried under vacuum at 40° C.

All operations take place in a dry nitrogen atmosphere.

Polymerization

In a 2.5 liter stainless steel autoclave equipped with a magnetically operated blade agitator and a water/steam temperature regulating jacket, are introduced 900 ml of anhydrous hexane in propylene flow. The temperature of the autoclave is brought to 40° C. and the catalyst component prepared as described above is introduced (0.5 g ca.) together with 1.5 g of $AlEt_2Cl$, and the proper amount of methyl p-toluate (MPT), all of which are precontacted for 10 minutes in 50 ml of hexane at room temperature. Pressure and temperature of the reaction are then brought to the desired values in about 5 minutes. The polymerization is carried out in two stages, the first in the absence of and the second in the presence of the proper quantity of hydrogen.

Polymerization conditions and characterization of the polymers obtained are reported respectively in Table 3A and Table 3B. The results in Table 3B were obtained with the methods previously described. In this case the test pieces have been obtained by compression molding, operating at a temperature of 200° C., and a pressure of 35 atm.

In particular, the negative results in Table 3B for the yield stress test (the sample breaks), show that the polymers of Comparative Examples 1 and 2 are very brittle.

TABLE 3A

|  | COMPARATIVE EXAMPLE | |
| --- | --- | --- |
|  | 1 | 2 |
| MPT, g | 0.42 | 0.47 |
| FIRST POLYMERIZATION STAGE | | |
| Temperature, ° C. | 70 | 70 |
| Pressure, atm | 6 | 6 |
| Time, min. | 15 | 15 |
| $H_2$, ml | 0 | 0 |
| SECOND POLYMERIZATION STAGE | | |
| Temperature, ° C. | 70 | 70 |
| Pressure, atm | 7.8 | 7.8 |
| Time, min. | 285 | 285 |
| $H_2$, ml | 2500 | 2500 |

TABLE 3B

| CHARACTERIZATION OF THE TOTAL POLYMER | COMPARATIVE EXAMPLE | |
| --- | --- | --- |
|  | 1 | 2 |
| Insoluble in xylene, % by weight | 96.9 | 97.0 |
| MIL, g/10 min. | 6.9 | 6.6 |
| [η], dl/g | 2.09 | 2.23 |
| Stress at yield, MPa | * | * |
| Stress at break, MPa | 32.5 | 33.8 |
| Mw/Mn | 24.4 | 37.3 |

* The sample breaks

Comparative Example 3

As a way of comparison, a conventional polypropylene Moplen Z 29 S, marketed by Himont Italia S.r.l., having a fraction insoluble in xylene of 97, MIL of 27 g/10 min., and Mw/Mn of 5.1 has been subjected to the MTT test (with a stretch ratio of 100). The MTT value was 0.15 g.

The invention claimed is:

1. Crystalline homopolymers of propylene or copolymers of propylene with from 0.5 to 6%, by weight with respect to the copolymer, of ethylene, a $C_{4-8}$ alpha-olefin or both, prepared by continuous sequential polymerization in at least two stages in the presence of a catalyst consisting essentially of a magnesium halide supported solid catalyst component,
an Al-alkyl compound, and
an external electron donor compound consisting of a silane compound having bonded to the silicon atom at least one cyclopentyl group and one or more -OR group wherein R is $C_{1-18}$ alkyl, $C_{3-18}$ cycloalkyl, $C_{6-18}$ aryl or $C_{7-18}$ aralkyl radical
and having a MIL>2g/10 minutes,
an intrinsic viscosity [η] in tetrahydronaphthalene at 135° C.≦2.8 dl/g,
a Mw/Mn>20,
a content of fraction insoluble in xylene at 25° C.≧94,
flexural modulus from 1600 to 2700 MPa, notched Izod at 23° C. from 15 to 100 J/m, and
stress at yield from 35 to 45 MPa,
from 10 to 60% by weight of a fraction (A) having [η]≧2.6 dl/g, and
from 40 to 90% of a fraction (B) having MIL≧50 g/10 minutes and [η]≦1.2 dl/g,
further comprising from 0.05 to 2% by weight of a nucleating agent with respect to the weight of said polymers and copolymers.

2. Polymers and copolymers of claim 1, further comprising from 2 to 50% by weight of an olefinic elastomer with respect to the weight of said polymers and copolymers.

3. A process for the preparation of polymers and copolymers of claim 1, comprising the polymerization of the monomers in the presence of a catalyst obtained by contacting:
  a) a solid catalyst component comprising a titanium compound having at least one titanium-halogen bond, and an electron-donor compound, both supported on a magnesium halide in active form;
  b) an Al-alkyl compound;
  c) an external electron-donor compound selected from the silanes containing at least one cyclopentyl group bonded to the silicon, and one or more -OR groups, also bonded to the silicon atom, where R is a $C_1$-$C_{18}$ alkyl, $C_3$-$C_{18}$ cycloalkyl, $C_6$-$C_{18}$ aryl, or $C_7$-$C_{18}$ aralkyl radical;

in which process the polymerization is carried out in at least two stages, preparing fractions (A) and (B) in separate and consecutive stages, and operating in each stage in the presence of the polymer and the catalyst coming from the preceding stage.

4. The process of claim 3, wherein fractions (A) and (B) are both prepared in gas phase.

* * * * *